US012450608B2

(12) United States Patent
Thomas et al.

(10) Patent No.: US 12,450,608 B2
(45) Date of Patent: Oct. 21, 2025

(54) TRANSACTION EVALUATION BASED ON A MACHINE LEARNING PROJECTION OF FUTURE ACCOUNT STATUS

(71) Applicant: SardineAI Corp., Miami, FL (US)

(72) Inventors: Bino John Thomas, Saint Johns, FL (US); Andrew Tausz, Toronto (CA); Kazuki Nishiura, Berkeley, CA (US); Soups Ranjan, Berkeley, CA (US); Srikant Rao, Pioneer, CA (US); Zehao Xu, Toronto (CA)

(73) Assignee: SardineAI Corp., Miami, FL (US)

( * ) Notice: Subject to any disclaimer, the term of this patent is extended or adjusted under 35 U.S.C. 154(b) by 5 days.

(21) Appl. No.: 18/077,145

(22) Filed: Dec. 7, 2022

(65) Prior Publication Data

US 2024/0193607 A1    Jun. 13, 2024

(51) Int. Cl.
*G06Q 20/40*        (2012.01)
*G06N 20/00*        (2019.01)

(52) U.S. Cl.
CPC ......... *G06Q 20/4016* (2013.01); *G06N 20/00* (2019.01); *G06Q 20/40* (2013.01)

(58) Field of Classification Search
None
See application file for complete search history.

(56) References Cited

U.S. PATENT DOCUMENTS

| 10,977,725 | B1* | 4/2021 | Flowers | G06N 5/04 |
| 2004/0158514 | A1* | 8/2004 | Yoshida | G06Q 30/02 |
| | | | | 705/35 |
| 2014/0279329 | A1* | 9/2014 | Dancel | G06Q 40/02 |
| | | | | 705/35 |
| 2017/0178093 | A1* | 6/2017 | Bull | G06Q 20/227 |
| 2019/0236598 | A1* | 8/2019 | Padmanabhan | G06Q 20/389 |
| 2019/0259095 | A1* | 8/2019 | Templeton | G06N 3/08 |
| 2019/0370634 | A1* | 12/2019 | Ferreira Moreno | |
| | | | | H04L 63/0428 |
| 2020/0265352 | A1* | 8/2020 | Haimes | G06Q 10/067 |
| 2021/0133751 | A1* | 5/2021 | Harris | G06Q 40/02 |
| 2021/0233087 | A1* | 7/2021 | Edwards | G06F 18/22 |
| 2021/0357923 | A1* | 11/2021 | Walters | G06Q 20/389 |
| 2021/0374749 | A1* | 12/2021 | Vukich | G06Q 20/405 |
| 2022/0051270 | A1* | 2/2022 | Benkreira | G06F 40/40 |
| 2022/0058516 | A1* | 2/2022 | Sarin | G06N 7/01 |

\* cited by examiner

*Primary Examiner* — William J Jacob
(74) *Attorney, Agent, or Firm* — Polsinelli PC

(57) ABSTRACT

The present technology pertains to an evaluation service for enhancing the accuracy of transaction-dependent parameter assessments. The evaluation service processes requests from web services concerning a subject entity's ongoing transaction, which relies on specific user account parameters meeting predetermined criteria. The evaluation service retrieves historical account data associated with the subject entity and utilizes a trained machine-learning model to predict a projected parameter at a future time. This model, optimized for analyzing historical data, forecasts the parameter with precision. The evaluation service generates a probability score indicating the likelihood of the projected parameter's accuracy at the specified future time.

17 Claims, 8 Drawing Sheets

TRANSACTION EVALUATION BASED ON A MACHINE LEARNING PROJECTION OF FUTURE ACCOUNT STATUS

TECHNICAL FIELD

The present technology pertains to reducing risk of transactions through an evaluation of an account to project a future account status.

BACKGROUND

Transactions of various types can take time to process, and with many such transactions the ability to conduct such a transaction is often based on a current account status, but there is often a risk that the account status could change before the transaction is completed. For example, the ability to conduct a transaction might depend on an account being in good standing with a service. For an account to be in good standing, the user might need to have paid a subscription fee, the account should be free from flags indicating fraud, the account should be free from indications that the account has violated terms of service agreements, or, in the case of transactions transferring assets, the account should have the assets to transfer or an ability to receive the assets. However, in some instances an account status can change while the transaction is being processed, which creates a risk to the performance of the transaction.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
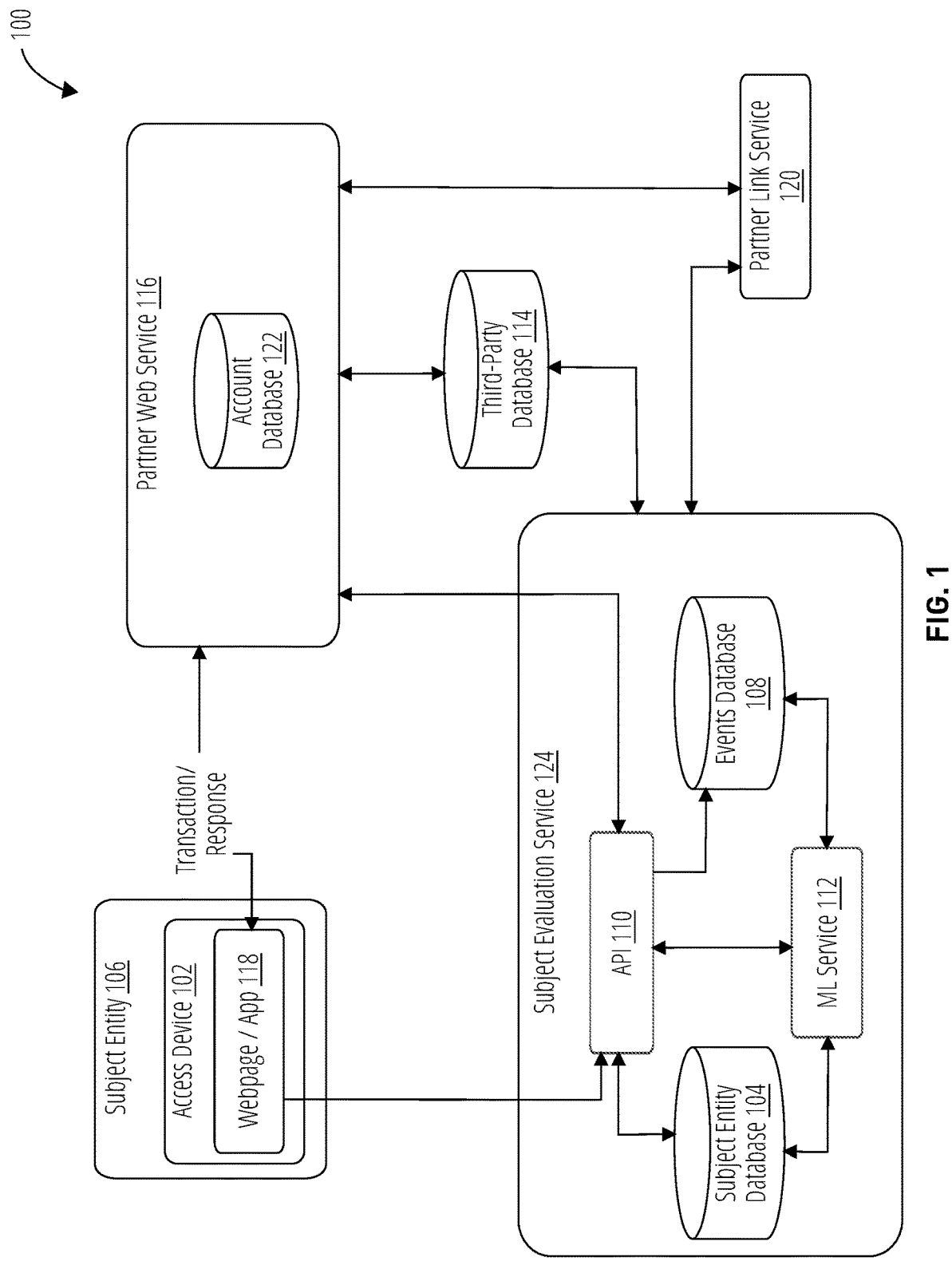
FIG. 1 illustrates an aspect of the subject matter in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Transactions of various types can take time to process, and with many such transactions the ability to conduct such a transaction is often based on a current account status, but there is often a risk that the account status could change before the transaction is completed. For example, the ability to conduct a transaction might depend on an account being in good standing with a service. For an account to be in good standing, the user might need to have paid a subscription fee, the account should be free from flags indicating fraud, the account should be free from indications that the account has violated terms of service agreements, or, in the case of transactions transferring assets, the account should have the assets to transfer or an ability to receive the assets. However, in some instances, an account status can change while the transaction is being processed, which creates a risk to the performance of the transaction.

An example of a transaction that may take time to process is a transaction to verify a person's identity. For example, some social media networks can verify the identity of famous personalities to verify that an account is controlled by the famous personality as opposed to someone that is impersonating the account. However, such accounts can be subject to terms of service that can include content moderation provisions, subscription fees, or other requirements, and the effort to confirm an identity can be a time-consuming process that would waste resources if that account were to become disqualified from the identity verification.

An example of a transaction that may take time to process is a transaction where an account status qualifies the user account for a privilege that is reserved in advance. For example a library account can qualify a user account to reserve media, but the period in which the media is reserved can extend to a period when a library account is no longer in good standing.

An example of a transaction that may take time to process is an automatic clearing house (ACH) transaction. ACH transactions have a predetermined settlement period and are typically not instantaneous. More specifically, the predetermined settlement periods often take between two and five days. Due to the delay between when an ACH transaction is performed and when the ACH transaction settles, there are often situations where an account no longer has enough funds to fulfill the ACH transaction. For example, a person may have a total of $1,000 in their account and decides to transfer $750 (ACH) to a bank on a first day. As yet another example, two ACH transactions may be performed, such that the the ACH transactions are initiated when the account balance is sufficient to complete the transaction, but before the second ACH transaction can clear the balance of the account can fall below a sufficient or required amount to settle the second ACH transaction.

While these transactions are often without malicious intent, some malicious users may attempt to take advantage of this ACH settlement delay to defraud banking institutions. Accordingly, the predetermined settlement period between the performance of the ACH transaction and the actual settlement of the transaction makes ACH transactions vulnerable to potential fraudulent attacks. In other words, there is often risk when performing an ACH transaction due to the potential for insufficient funds, whether fraudulent or benign.

Accordingly, the present technology addresses the need in the art for reducing risk in transactions that may take time to process by utilizing a machine learning algorithm to analyze an account and predict the likelihood that the account will maintain the conditions necessary to complete the transaction at the time the transaction will complete. The present technology can also generate a risk score based on the prediction(s).

As noted above, there are many examples of transactions that may take time to process. Throughout much of this description, the present disclosure will focus on ACH transactions with particularity. However, it will be appreciated by those of ordinary skill in the art that the principles applied to ACH transactions might be readily portable to other transactions.

In the context of ACH transactions, the present technology addresses the need in the art for reducing risk of ACH transactions by predicting cash flow/account balances at the time of settlement and generating a risk score based on the prediction(s). These predictions can utilize various historical transaction data. For example, cash flow predictions can rely, at least in part, on regular payroll deposits into the account (e.g., monthly, bi-weekly, weekly, etc.), monthly mortgage payments, etc. In other words, the model can identify patterns in the historical transaction data to inform likely future transactions, cash flow, and/or account balances. Another factor may include identifying which account among multiple accounts of the user is involved with the transaction. For example, utilizing a primary account which receives regular payroll deposits would have less risk compared to a secondary account to which the user infrequently moves funds.

FIG. 1 illustrates an example network environment 100 for utilizing a subject evaluation service 124 to assist a partner web service 116 to evaluate transactions by a subject entity 106 utilizing the partner web service 116.

FIG. 1 illustrates an example network environment 100, in which a subject entity 106 utilizes an access device 102 to access a partner web service 116 associated with a partner web service 116 (e.g., a merchant, provider, payment processor, financial institution, crypto exchange, crypto wallet, etc.). In some embodiments, the partner web service 116 has a webpage/app 118 (application (app) or webpage) loaded and executing on the access device 102. The webpage/app 118 associated with the partner web service 116 can include code to report various events to API 110 of subject evaluation service 124. In some instances, the webpage/app 118 can report the events directly to API 110, and in some cases, the webpage/app 118 can report the events through partner web service 116. As will be described further herein, the events that are reported to API 110 of subject evaluation service 124 are useful in providing additional insight into the transaction regarding the likelihood that the subject entity 106 is a fraudulent party that is attempting to conduct the transaction, or other insight pertaining to the subject entity 106.

Subject entities 106 can include individuals and entities that conduct transactions. More specifically, subject entities 106 can perform or conduct on-chain transactions, off-chain transactions, and traditional transactions. On-chain transactions are transactions that occur on a blockchain that are reflected on a distributed, public ledger. On-chain transactions are typically validated and authenticated and lead to an update to the overall blockchain network. For example, a subject entity 106 may purchase a cryptocurrency on a crypto exchange. Off-chain transactions are transactions that occur outside of a blockchain. For example, a subject entity 106 may purchase a cryptocurrency wallet from another person, such that the value of the cryptocurrency is transferred to the subject entity 106, but the blockchain does not identify the transaction. Traditional transactions are transactions that are unrelated to blockchains, such as a credit card transaction at a merchant, depositing a check, an Automated Cleaning House (ACH) transaction to move money from one account to another, etc. For example, a subject entity 106 may purchase clothing with a credit card or debit card on a third-party website (e.g., a partner web service 116) that is associated with or otherwise connected to network environment 100.

Partner web services 116 are applications, websites, and/or services for entities or platforms (e.g., merchants, service providers, payment processors, financial institutions, crypto exchanges, crypto wallets, etc.) associated with or otherwise connected to network environment 100. For example, merchants typically have a website (e.g., a partner web service 116) that people can purchase goods or access services. As another example, people typically use a website or crypto exchange service to trade cryptocurrency.

Partner web service 116 can be in communication with various databases and services. For example, partner web service 116 can have access to one or more databases maintained by partner web service 116, such as, for example, an account database 122 that stores user profiles and other account information associated with respective subject entities 106. Partner web service 116 can also communicate with and access one or more third-party databases 114 such as credit reporting databases, people search databases, social network databases, etc., to access additional information pertinent to the services provided by partner web service 116.

In some embodiments, network environment 100 can be useful to connect partner web service 116 to subject evaluation service 124 to evaluate the subject entity attempting to conduct a transaction with partner web service 116. Subject evaluation service 124 can perform its functions for many partner web services 116, and as such, it can aggregate information about the subject entity 106 as the subject entity interacts with the partner web services 116 across the Internet. Subject evaluation service 124 can build a profile to identify subject entities using behavioral data that is difficult for those committing fraud to impersonate. Subject evaluation service 124 can utilize transaction information from many partner web service 116 to train one or machine learning algorithms using ML service 112 to evaluate various transaction dimensions to determine whether the subject entity is authentic or is a fraudulent entity impersonating the subject entity.

Subject entity database 104 can store routine personal identifying information such as phone numbers, e-mails, SSNs, bank account numbers, credit card numbers, blockchain wallets, etc., and user behavior information such as typing dynamics, mouse control dynamics, access device identifying information, and more. In other words, subject entity database 104 can include various types of data that can identify and/or be linked to or associated with a particular user (e.g., subject entity 106).

In some embodiments, the subject evaluation service 124 can utilize the ML service 112 to train machine learning algorithms to evaluate other aspects of a transaction beyond whether a fraudulent entity is impersonating the subject entity 106. For example, the subject evaluation service 124 can include ML algorithms that are able to evaluate patterns in a subject entity's service usage to help evaluate transaction risks associated with a particular transaction involving the subject entity.

Application programming interface 110 (API 110) provides an interface between partner web service 116 and subject evaluation service 124 and is configured to receive event data from webpage/app 118. The event data can include a variety of information pertaining to aspects of how the subject entity 106 interacts with the webpage/app 118 (e.g., mouse movements, keyboard events, typing speed, movement of the device, etc.). In some aspects, the event data is pseudo-biometric data because a collection of such data can be used to identify a particular subject entity. API 110 is configured to record various behavioral biometrics. In some embodiments, the device events can be collected and reported by a script or algorithm deployed on webpage/app 118 that communicates directly or indirectly (through partner web service 116) with API 110 of subject evaluation service 124. In some embodiments, webpage/app 118 is further configured to stream the data (for example, while a subject entity 106 is filling out a form), or in a batch (after the subject entity 106 submits the form).

Events database 108 is configured to store the data received by API 110. In some embodiments, events database 108 is further configured to communicate with ML service 112.

API 110 is configured to record biometric data (e.g., mouse movements, keyboard events, typing speed, movement of the device, etc.). In some embodiments, API 110 is called by an algorithm, script, or a software development kit (SDK) deployed on partner web service 116 and executed on or by access device 102. Additionally, API 110 is configured to asynchronously receive biometric behavioral data and/or device intelligence data. Similarly, API 110 is configured to asynchronously provide the biometric data and/or device intelligence data to events database 108. In some embodiments, API 110 is also configured to provide the data to ML service 112.

ML service 112 can be configured to receive data to train an ML model and/or to use a trained ML model to evaluate received data. More specifically, ML service 112 can be configured to receive the behavioral biometric data and/or device intelligence data from events database 108 to train the ML model or to receive data from API 110 to identify a particular user associated with the data using a trained ML model.

Subject entity database 104 can be the same database as events database 108 or separate. Subject entity database 104 can be configured to store information about a subject entity. For example, subject entity database 104 can store statistics regarding the behavioral biometric data and/or device intelligence data that might be used to identify a subject entity and/or the access devices that a subject entity regularly utilizes to access one or more services. Subject entity database 104 can also be configured to store conclusions of a trained ML algorithm pertaining to subject entity, such as a conclusion of the approximate age of the subject entity based on data defining attributes of how the subject entity moves a mouse or their typing speed.

In some embodiments, the subject evaluation service 124 might access one or more third-party database 114 or partner link service 120 to collect additional information to evaluate subject entity 106. One or more third-party databases 114 can include credit reporting databases, people search databases, social network databases, etc. The partner link service 120 can be a service that has access to one or more accounts of the subject entity 106, including accounts at web services other than the partner web service 116. Some partner link services 120 can obtain account access credentials from subject entity 106 to one or more accounts to facilitate the processing of one or more transactions on behalf of subject entity 106.

Collectively network environment 100 provides a system that facilitates a partner web service 116 to utilize evaluations made by the subject evaluation service 124 regarding the subject entity 106 to permit the partner web service 116 to decide whether to proceed with a transaction. Such evaluations might indicate that a fraudulent party is impersonating a subject entity and/or that a subject entity is attempting to perform a transaction that might come with increased risk. The subject evaluation service 124 can make these evaluations because subject evaluation service 124 tracks a subject entity and aggregates data as the subject entity performs transactions with a plurality of web services.

Figure 2:
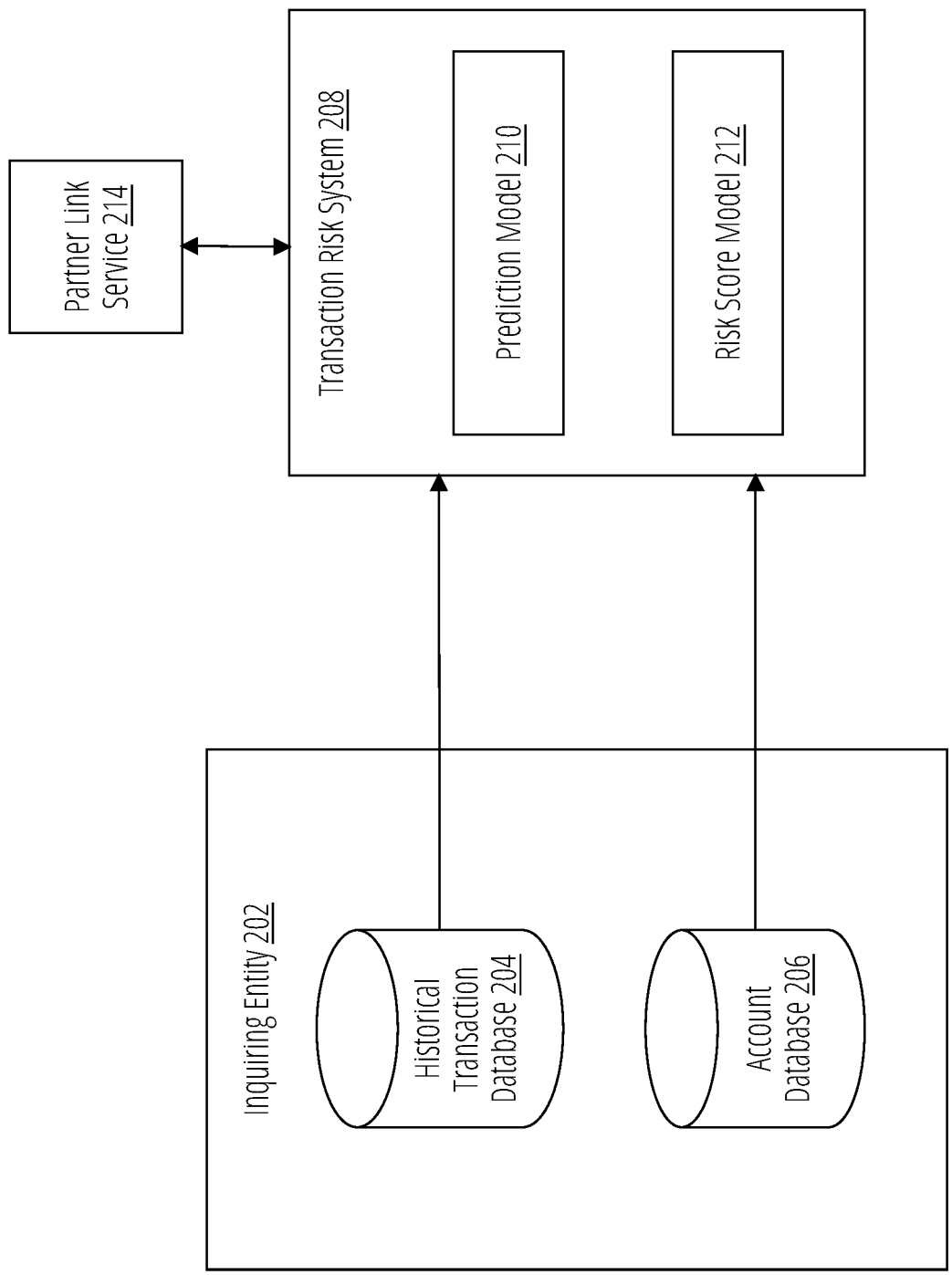
FIG. 2 illustrates a schematic block diagram of a cash flow prediction workflow in accordance with some aspects of the present technology.

FIG. 2 illustrates an environment having an inquiring entity 202 using an access device to request information and receive a response from a transaction risk system 208 regarding a risk that account data associated with a subject entity 106 might change in a way that would provide risk to a transaction that requires a duration to complete. In some embodiments, the inquiring entity 202 is the partner web service 116.

As addressed above, there are many types of transactions that take time to process, and the longer the duration to process the transaction, the more susceptible the transaction is to risk from changing account conditions. For example, the ability to conduct a transaction might depend on an account being in good standing with a service. For an account to be in good standing, the user might need to have paid a subscription fee, the account should be free from flags indicating fraud, the account should be free from indications that the account has violated terms of service agreements, or, in the case of transactions transferring assets, the account should have the assets to transfer or an ability to receive the assets. However, in some instances, an account status can change while the transaction is being processed, which creates a risk to the performance of the transaction.

An example of a transaction that may take time to process is a transaction to verify a person's identity. For example, some social media networks can verify the identity of famous personalities to verify that an account is controlled by the famous personality as opposed to someone that is impersonating the account. However, such accounts can be subject to terms of service that can include content moderation provisions, subscription fees, or other requirements, and the effort to confirm an identity can be a time-consuming process that would waste resources if that account were to become disqualified from the identity verification.

An example of a transaction that may take time to process is a transaction where an account status qualifies the user account for a privilege that is reserved in advance. For example a library account can qualify a user account to reserve media, but the period in which the media is reserved can extend to a period when a library account is no longer in good standing.

An example of a transaction that may take time to process is an automatic clearing house (ACH) transaction. ACH transactions have a predetermined settlement period and are typically not instantaneous. More specifically, the predetermined settlement periods often take between two and five days. Due to the delay between when an ACH transaction is performed and when the ACH transaction settles, there are often situations where an account no longer has enough funds to fulfill the ACH transaction. For example, a person may have a total of $1,000 in their account and decides to transfer $750 (ACH) to a bank on a first day. As yet another example, two ACH transactions may be performed, such that the ACH transactions are initiated when the account balance is sufficient to complete the transaction, but before the second ACH transaction can clear the balance of the account can fall below a sufficient or required amount to settle the second ACH transaction.

While FIG. 2 is addressed with respect to an ACH transaction, it will be appreciated that the principles discussed herein apply to any transaction susceptible to risk from an account status while the transaction is being processed.

The inquiring entity 202 may be interested in determining a risk of a current automated clearing house (ACH) transaction that is being performed with a subject entity (e.g., subject entity 106). For example, a subject entity may have a user account with the inquiring entity 202 that is linked to a bank account at another party. The subject entity may desire to perform a transaction using the inquiring entity 202 that requires an ACH transaction. For example, some peer payments services like PAYPAL, VENMO, ZELLE, CASH APP, etc., can permit a subject entity to send funds to other entities having accounts with the same service. These services typically can interact with a bank account of the subject entity through ACH transfers to bring funds into and out of the user account at the service. Furthermore, the bank associated with the bank account has data on inflows into and outflows out of the bank account, but the inquiring entity 202 only has access to transactions between the inquiring entity 202 and the bank account. In other words, inquiring entity 202 has no visibility or insight into transactions that occur without inquiring entity 202, which results in higher susceptibility to risk for the inquiring entity 202.

A transaction that would expose a peer payment service is one where the subject entity requests to send money to a friend using the peer payment service. The peer payment service can determine that the users bank account has enough money to cover the transaction, and therefore it can transfer the money to the friend's account at the peer payment service. At the same time the peer payment service can initiate an ACH transaction to take the funds from the subject entity's bank account to recover the money transferred to the friend. The friend's account on the payment service can immediately reflect that they have received the money from the subject entity, and that friend can promptly transfer that money to another source on the payment service, or initiate an ACH transaction to send the money outside of the peer payment service. If any of these subsequent transactions occur prior to the peer payment service receiving funds from the subject entity's bank account, the peer payment service is at risk that the subject entity's bank account will not have the funds to cover the transfer when the ACH transaction is ready to clear. Meanwhile the peer payment service no longer has the ability to reach the initially transferred funds because those funds are no longer in the account to which they were transferred.

As discussed above, ACH transactions implicitly have some risk associated therewith due to the delay between performance of the ACH transaction and settlement of the ACH transaction. Thus, the inquiring entity 202 may be interested in determining whether the bank account of the subject entity will have enough funds therein at the time of settlement of the ACH transaction.

Accordingly, inquiring entity 202 is configured to send a request to transaction risk system 208. In some embodiments, inquiring entity 202 sends a request to transaction risk system 208 through an API (e.g., API 110) associated with transaction risk system 208. The request can identify a subject entity and a current ACH transaction that the subject entity is attempting to perform. In some embodiments, identifying the subject entity can include providing bank account information (e.g., a bank account number), a username, first and/or last name, etc. In some embodiments, identifying the current ACH transaction can include the amount of the transaction, a transaction identifier (ID), a sending account identifier or number, and/or a receiving account identifier or number.

In some embodiments, the inquiring entity 202 is a financial institution that the subject entity is requesting to perform the ACH transaction. For example, the subject entity may have a bank account with the subject entity and is using the bank account to perform the ACH transaction. Thus, inquiring entity 202 may have access to historical transaction database 204 and account database 206. Accordingly, inquiring entity 202 may send historical transaction data and account balance data to transaction risk system 208. For example, historical transaction database 204 and account database 206 may be third-party databases 114, which can be accessible by transaction risk system 208 and/or prediction model 210. Although historical transaction database 204 and account database 206 are shown in FIG. 2 as a part of inquiring entity 202, it is further considered that transaction risk system 208 and/or prediction model 210 may also have access to other historical transaction databases 204, account balance account databases 206, and/or third-party databases 114 that are not in and/or associated with inquiring entity 202.

Historical transaction database 204 is configured to store historical transaction data for each subject entity. In some embodiments, historical transaction database 204 is in communication with and/or a part of account database 206. For example, a database may be configured to calculate an account balance based on historical transactions of the account. Historical transaction data can include deposits, withdrawals, fees, transfers, ACH transactions, payroll payments, direct deposits, etc. In some embodiments, historical transaction data can be stored and categorized. For example, biweekly direct deposits into the account may be categorized as payroll payments or income.

Account database 206 is configured to store account balance data for each subject entity. In some embodiments, account database 206 is in communication with and/or a part of historical transaction database 204. For example, a database may be configured to identify an account balance for each subject entity, while also including entries that modify the account balance (e.g., transactions).

Transaction risk system 208 is configured to assess risk. In some embodiments, transaction risk system 208 is a part of and/or in communication with prediction model 210. For example, transaction risk system 208 can be a part of subject evaluation service 124 and/or in communication therewith.

In some embodiments, transaction risk system 208 may also be referred to as a transaction risk model. Additionally, transaction risk system 208 can leverage prediction model 210 and risk score model 212. In some embodiments, the transaction risk model comprises prediction model 210 and risk score model 212. In some embodiments, transaction risk system 208 is configured to assess risk for a particular ACH transaction (e.g., a current ACH transaction identified by inquiring entity 202). For example, the transaction risk model can be a transaction risk model for insufficient funds errors. As another example, the transaction model can be a transaction risk model for identifying fraud.

In some embodiments, prediction model 210 is a cash flow prediction model that is configured to receive a particular ACH transaction (e.g., a current ACH transaction identified by inquiring entity 202) and predict a projected balance at the time of settlement of the particular ACH transaction. In some embodiments, cash flow prediction model may additionally and/or alternatively predict a change in cash balance of the account. The cash flow prediction model can be configured to predict a projected balance at or change in cash balance of the account until the time of settlement of the particular ACH transaction based on transaction history data and/or account balance data.

Additionally, cash flow prediction model can be configured to identify patterns in the transaction history data. Cash flow prediction model can identify deposits in regular intervals (e.g., biweekly, bimonthly, monthly, etc.) and/or in consistently the same or substantially similar value as payroll payments and then extrapolate or predict the time and value of the next occurrence of the payroll payment. For example, a subject entity may receive direct deposits bimonthly, such that the bank account receives a direct deposit of $2,000 every 5th and 22nd of the month. The cash flow prediction model can identify the pattern of $2,000 direct deposits on the 5th and 22nd of every month and predict that the next direct deposit will occur on the sooner of the 5th and 22nd of this or the following month. The cash flow prediction model can identify regular deductions from fees (e.g., monthly maintenance fees, out-of-network ATM fees, overdraft fees, insufficient fund fees, wire transfer fees, etc.) and predict the next occurrence of a particular fee. For example, a subject entity may utilize a bank account that has a monthly maintenance fee of $5 that is charged on the first every month. The cash flow prediction model can identify the regular monthly maintenance fee and predict that the next monthly maintenance fee will occur on the first of the next month. As yet another example, a subject entity may irregularly use out-of-network ATMs and be charged fees accordingly. The cash flow prediction model can identify a frequency of the out-of-network ATM fees and probabilistically determine when the next occurrence of an out-of-network ATM fee may be applied to the account. The cash flow prediction model can also identify a pattern of ad hoc deposits. For example, a subject entity may regularly deposit funds into the account prior to and/or during an ACH transaction. The cash flow prediction model can identify that the subject entity regularly deposits funds into the account prior to and/or during an ACH transaction predict that the subject entity will likely deposit additional funds during the time period between initiation and settlement of the ACH transaction. In some embodiments, the cash flow prediction model may be configured to compare habits and activities of the user to habits and activities of additional users connected to the platform. For example, the user may be more prone than others to moving funds around, so the cash flow prediction model may be able to identify that the user is more prone to moving funds around, which may increase risk due to less certainty that the funds will remain in the proper account. In some embodiments, the cash flow prediction model may be configured to utilize historical transaction data for other platforms and/or partners (e.g., via partner link service 214). The cash flow prediction model can utilize the partner link service 214 to further determine and refine predictions, identify other accounts, incorporate more habits and activities of the user, etc.

Risk score model 212 is configured to receive a particular ACH transaction (e.g., a current ACH transaction identified by inquiring entity 202) and provide a risk score for the particular ACH transaction based on a projected balance at or change in cash balance of the account until the time of settlement of the particular ACH transaction. In other words, the risk score identifies a likelihood that the particular ACH transaction will result in an insufficient funds error. In some embodiments, the risk score may additionally and/or alternatively identify a likelihood that the particular ACH transaction will be successful. Risk score model 212 can provide a risk score for the particular ACH transaction by determining a likelihood that the account balance will have enough funds to fulfill the ACH transaction. Risk score model 212 can also generate the risk score based on various other factors. For example, the risk score can additionally and/or alternatively be based on patterns of deposits, withdrawals, fees, etc. As yet another example, the risk score can be based on a probability that a subject entity may inadvertently forget to add additional funds to the account. As yet another example, the risk score can additionally and/or alternatively be based on whether the bank account that the subject entity is using to perform the ACH transaction is the primary bank account versus a secondary or otherwise non-primary bank account. More specifically, a primary bank account is more likely to be more regularly attended to. For example, primary bank accounts are more likely to have payroll direct deposits applied thereto, while secondary bank accounts are more likely to have ad hoc or irregular transfers.

In some embodiments, the cash flow prediction model and risk score model 212 are one model, such that the combined or one model is configured to receive a particular ACH transaction (e.g., a current ACH transaction identified by inquiring entity 202), predict a projected balance at or change in cash balance until the time of settlement of the particular ACH transaction, and provide a risk score for the particular ACH transaction based on confidence score for projected balance.

It is further considered that risk score model 212 can leverage other aspects of prediction model 210. For example, risk score model 212 can utilize ML service 112 to train and deploy prediction model 210 and risk score model 212. As another example, prediction model 210 can utilize subject evaluation service 124 to determine whether a particular ACH transaction is likely to be fraudulent. As yet another example, risk score model 212 can leverage a fraud risk model of the subject evaluation service 124 to determine whether a user is maliciously performing the ACH transaction. In some embodiments, the fraud risk model is based at least in part on the biometric and device fingerprinting to determine whether a user is maliciously performing the ACH transaction.

In some embodiments, transaction risk system 208 can utilize a partner link service 214 (e.g., partner link service 120) to learn information about user accounts of the subject entity at other services. Some partner link services 120 can obtain account access credentials from subject entity 106 to one or more accounts to facilitate the processing of one or more transactions on behalf of subject entity 106.

Transaction risk system 208 provides a response including the risk score back to inquiring entity 202. The response can also include other information including, but not limited to, cash flow predictions, projected account balance at the time of settlement of the particular ACH transaction, likelihood that the ACH transaction is fraudulent, etc.

As discussed above, FIG. 2 is addressed with respect to an ACH transaction. However, one of ordinary skill in the art would understand that the principles discussed herein apply to any transaction susceptible to risk from an account status or other parameter change while the transaction is being processed.

For example, historical transaction database 204 may additionally and/or alternatively be an activity database. The activity database can include different activities performed by the respective subject entity. For example, for a library account as in the example discussed above, the activity database may include records of when the subject entity checked media in and out. More examples can include the activity database identifying when an account violates a terms of service agreement, when an account exercises one or more privileges associated therewith, when the subject entity pays for subscription fees for the account and methods therefor (e.g., autopayment, manual payment, etc.), etc.

In some embodiments, account database 206 is configured to store parameters and account data for each subject entity. Account database 206 may identify an identity of the owner of the account (e.g., the subject entity), a status of an account, privileges associated with the account, any flags associated with the account, etc. For example, account database 206 may identify whether an account is in good standing, whether the user has paid the subscription fee, whether there are any flags for potential fraud, whether the account has violated terms of services agreements, etc. As another example, account database 206 may identify that one account has privileges to reserve certain types of media (e.g., books) in advance, another account has privileges to reserve different types of media (e.g., movies) in advance, and yet another account does not have privileges to reserve any type of media in advance.

In some embodiments, prediction model 210 can receive a request regarding an account of a particular subject entity or transaction association to the particular subject entity and predict a status or other parameter of an account of the particular subject entity. For example, prediction model 210 can receive a request regarding verifying a user's identity on a social media network, such that an account of the user on the social media network is currently in good standing and claims to be a famous person. Prediction model 210 can receive information from historical transaction database 204, the activity database, and/or account database 206 and identify patterns from the data. For example, the user may regularly post content that violates the terms of service (e.g., content moderation provisions) for the social media network. Prediction model 210 can identify the pattern of regular content that violates the terms of service and predict that the account will likely not be in good standing after the time-consuming process of identifying whether the account truly belongs to the famous person that the user claims to be. As another example, prediction model 210 can receive a request regarding reservation of media in advance by a user. Prediction model 210 can receive data from the databases discussed above and identify patterns from the data. For example, the user may manually pay a subscription fee for the service that the user is reserving media from. Furthermore, the user may often forget to pay the subscription fee on time, causing the account to regularly be delinquent or otherwise not in good standing. Prediction model 210 can identify the pattern of late payments and predict that the account will likely no longer be in good standing at an end of the reservation of the media. Similarly, prediction model 210 can identify that the payment deadline for subscription fee would occur after an end of the reservation of the media and predict that the account will likely remain in good standing.

In some embodiments, risk score model 212 is configured to receive a request regarding an account of a particular subject entity or transaction associated to the particular subject entity and predict a risk score. The risk score identifies a likelihood that a status or other parameter of the account will change (e.g., an account of good standing to a delinquent account). In some embodiments, the risk score may additionally and/or alternatively identify a likelihood that the request will be properly fulfilled. Risk score model 212 can also generate the risk score based on various other factors. For example, the risk score can additionally and/or alternatively be based on patterns of payment of subscription fees, patterns of violating terms of service agreements, whether the request deviates from a regular pattern of activity of the account, etc.

The above are non-exhaustive examples of the present technology. As discussed above, one of ordinary skill in the art would understand that the principles disclosed herein are applicable to any transaction susceptible to risk from an account status or change in other parameters while the transaction is being processed or otherwise requires some amount of time to complete.

Figure 3:
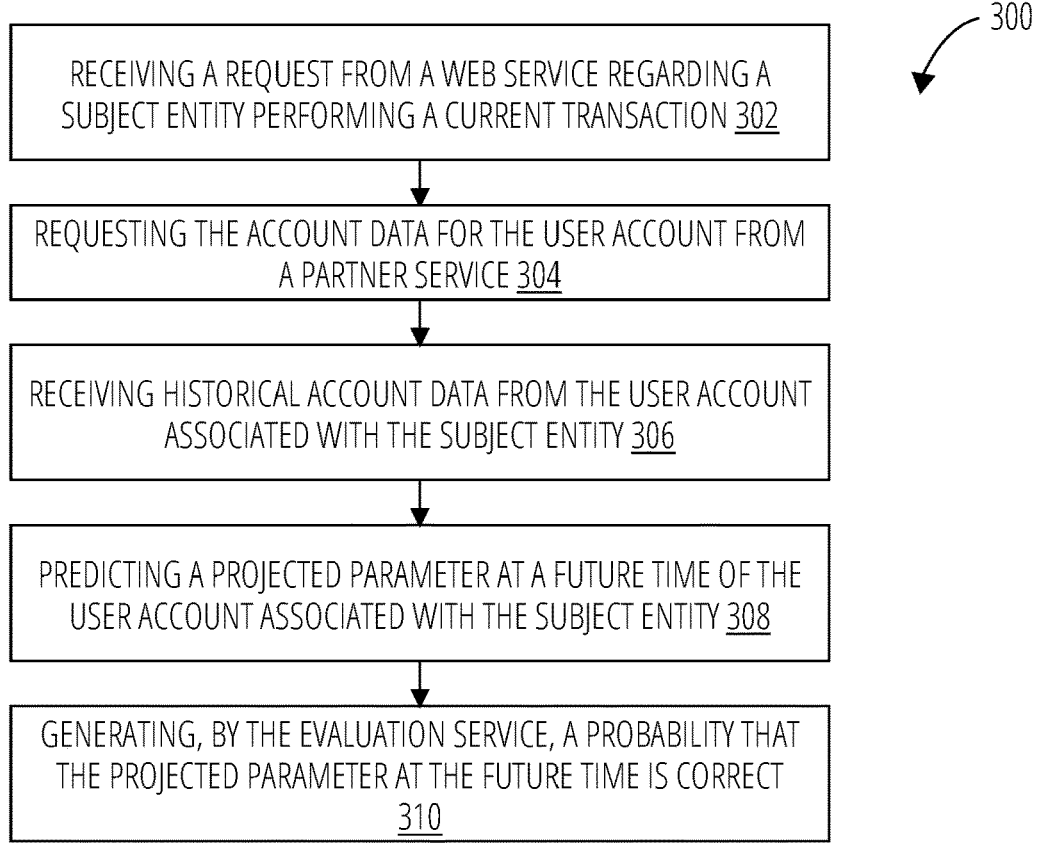
FIG. 3 illustrates an example method for evaluating a current transaction by predicting a future parameter of a user account using a machine learning model in accordance with some aspects of the present technology.

FIG. 3 illustrates an example routine for evaluating a current transaction by predicting a future parameter of a user account using a machine learning model. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

In step 302, method 300 includes receiving a request from a web service regarding a subject entity performing a current transaction. The request can be to evaluate a parameter of a user account at a later time, where the transaction's success is dependent on the parameter at the later time. For example, the subject evaluation service 124 illustrated in FIG. 1 may receive a request from a web service regarding a subject entity performing a current transaction. In some embodiments, the current transaction is dependent on a parameter of a user account associated with the subject entity meeting a criterion.

In step 304, method 300 includes requesting the account data for the user account from a partner service. For example, the subject evaluation service 124 illustrated in FIG. 1 may request the account data for the user account from a partner service. In some embodiments, the account that needs to be evaluated is not under the control of the web service or the evaluation service. Accordingly, to access the account data needed to evaluate the parameter, the account data needs to be retrieved from a third party. In some embodiments, the subject evaluation service 124 can use a partner service, where the partner service has access to the historical account data from the user account associated with the subject entity. For example, the partner service can be linked to a plurality of third party services. In some embodiments, the partner service was provided with credentials for by the subject entity for the plurality of third party services.

The fact that the partner service can access additional user accounts beyond the user account that is immediately relevant to the transaction can be helpful too. Sometimes, a user can have several user accounts at different services that are all inter-related. For example, a user might move funds between bank accounts. As another example, a user might use a content management system to store documents, but use a workflow tool to advance a project involving the document, or use a signature service to collect signatures on the document. Depending on the transaction, knowledge of these other accounts can be helpful in predicting the parameter at the future time.

In step 306, method 300 includes receiving historical account data from the user account associated with the subject entity. For example, the subject evaluation service 124 illustrated in FIG. 1 may receive historical account data from the user account associated with the subject entity. In some embodiments, when it is available from the partner service, the historical account data can also include data from other related user accounts.

In step 308, method 300 includes predicting a projected parameter at a future time of the user account associated with the subject entity. For example, the subject evaluation service 124 illustrated in FIG. 1 may predict a projected parameter at a future time of the user account associated with the subject entity. In some embodiments, the evaluation service includes a trained machine learning model configured to receive the historical account data for the user account and to predict the projected parameter. In some embodiments, predicting the projected parameter includes receiving data defining the current transaction with the request. In some embodiments, predicting the projected parameter includes inputting the data defining the current transaction into the trained machine learning model.

In step 310, method 300 includes generating, by the evaluation service, a probability that the projected parameter at the future time is correct. For example, the subject evaluation service 124 illustrated in FIG. 1 may generate, by the evaluation service, a probability that the projected parameter at the future time is correct.

In some embodiments, the partner web service 116 can receive the information from the subject evaluation service 124 and can make a determination about whether to go initiate the transaction. It is further considered that the partner web service 116 can send information regarding the determination back to continue training the machine learning model.

Figure 4:
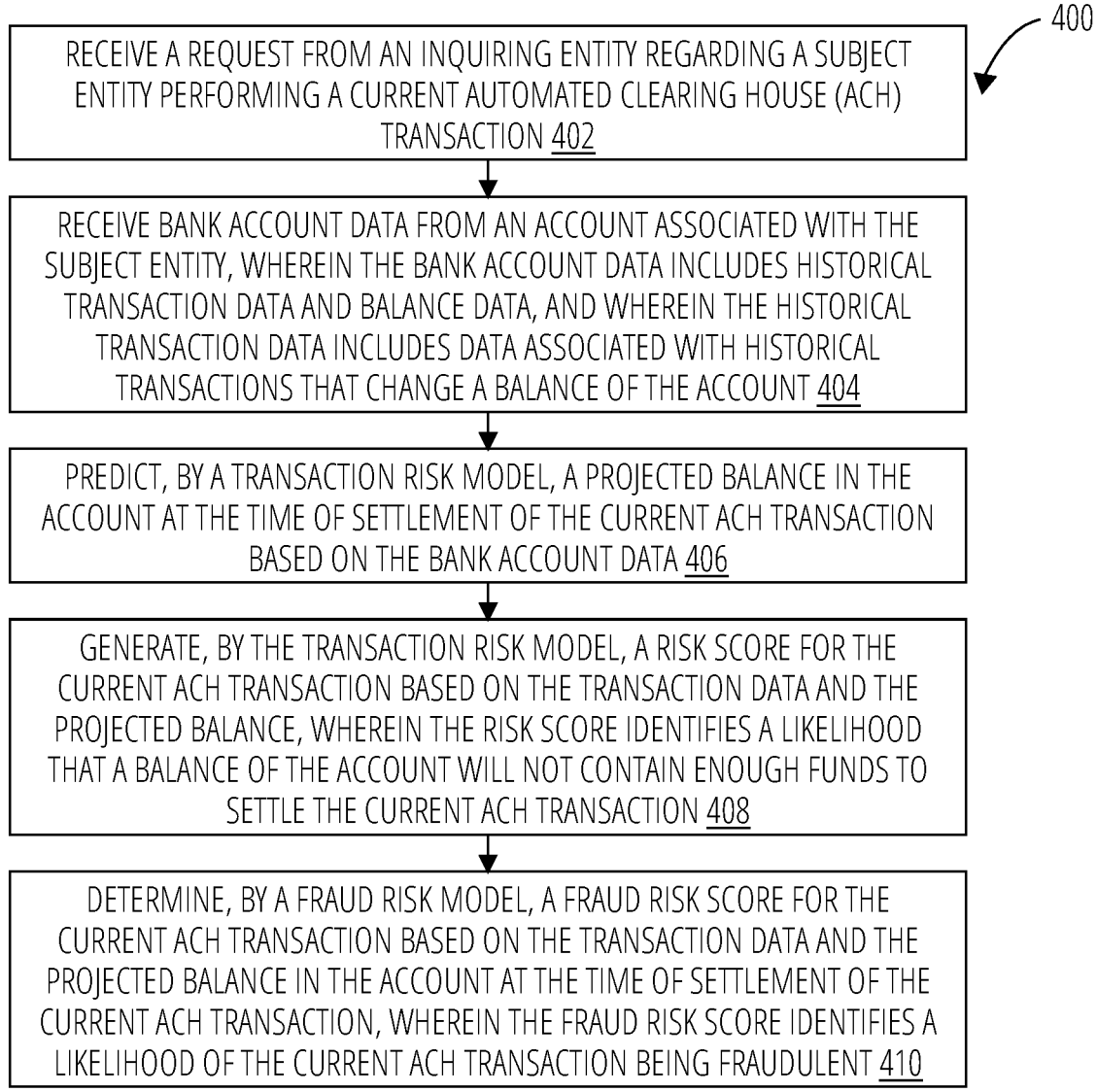
FIG. 4 illustrates an example method for determining a risk score for a current ACH transaction in accordance with some aspects of the present technology.

FIG. 4 illustrates an example method 400 for determining a risk score for a current ACH transaction. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

In step 402, method 400 receives a request from an inquiring entity regarding a subject entity performing a current automated clearing house (ACH) transaction. For example, transaction risk system 208 receives a request from an inquiring entity regarding a subject entity performing a current automated clearing house (ACH) transaction.

In step 404, method 400 receives bank account data from an account associated with the subject entity, wherein the bank account data includes historical transaction data and balance data, and wherein the historical transaction data includes data associated with historical transactions that change a balance of the account. For example, transaction risk system 208 receives bank account data from an account associated with the subject entity, wherein the bank account data includes historical transaction data and balance data, and wherein the historical transaction data includes data associated with historical transactions that change a balance of the account. In some embodiments, the bank account data is received from partner link service 214 which has access to one or more of the subject entities bank accounts and associated data.

In step 406, method 400 predicts a projected balance in the account at the time of settlement of the current ACH transaction based on the bank account data. For example, transaction risk system 208 predicts a projected balance in the account at the time of settlement of the current ACH transaction based on the bank account data. In some embodiments, predicting the projected balance includes inputting the current ACH transaction into the transaction risk model, wherein the transaction risk model is configured to receive a particular ACH transaction and output a risk score associated with the particular transaction.

In step 408, method 400 generates a risk score for the current ACH transaction based on the historical transaction data and the projected balance, wherein the risk score identifies a likelihood that a balance of the account will not contain enough funds to settle the current ACH transaction. For example, transaction risk system 208 generates a risk score for the current ACH transaction based on the historical transaction data and the projected balance, wherein the risk score identifies a likelihood that a balance of the account will not contain enough funds to settle the current ACH transaction.

In step 410, method 400 determines a fraud risk score for the current ACH transaction based on the historical transaction data and the projected balance in the account at the time of settlement of the current ACH transaction, wherein the fraud risk score identifies a likelihood of the current ACH transaction being fraudulent. For example, transaction risk system 208 determines a fraud risk score for the current ACH transaction based on the historical transaction data and the projected balance in the account at the time of settlement of the current ACH transaction, wherein the fraud risk score identifies a likelihood of the current ACH transaction being fraudulent.

Although FIG. 4 is addressed with respect to an ACH transaction, one of ordinary skill in the art would understand that the principles discussed herein apply to any transaction susceptible to risk from an account status or other parameter change while the transaction is being processed.

More generally, transaction risk system 208 may receive a request from an inquiring entity regarding a subject entity performing a transaction at step 402. Transaction risk system 208 can receive activity data and/or account data at step 404. Transaction risk system 208 can predict, based on the activity data and/or account data, whether a status or other parameter of an account of the subject entity will change at step 406. Transaction risk system 208 can generate, based on the activity data and/or account data, a risk score for the transaction at step 408. Transaction risk system 208 can also determine, based on the activity data and/or account data, a fraud risk score for the transaction.

For example, transaction risk system 208 may receive a request from a library (e.g., an inquiring entity) regarding a user (e.g., a subject entity) borrowing a book for two weeks. Transaction risk system 208 can receive a borrowing history or a transaction log of dates when the user checks a book out and checks the book back in (e.g., historical transaction data and/or activity data) and/or various status parameters of the account including, but not limited to, whether the account has books that have not been checked in, whether the account is in good standing or banned, an identity of the user of the account, whether the user has other accounts with the system, etc. (e.g., account data). Transaction risk system 208 can predict, based on the above and/or additional other data, to predict whether the account will remain in good standing, whether the account will continue to have all dues paid, etc. Additionally, transaction risk system 208 can predict whether the user will be delinquent or late in returning the book, how long the user may actually keep the book checked out, etc. Furthermore, transaction risk system 208 can generate, based on the above and/or additional other data, a risk score. The risk score can identify, for example, a likelihood that the book will be returned late, that the account will no longer remain in good standing, that the account will become delinquent on fees, etc.

Accordingly, one of ordinary skill in the art would understand that the present technology discloses concepts that can apply to any transaction susceptible to risk from an account status or other parameter change while the transaction is being processed.

Figure 5A:
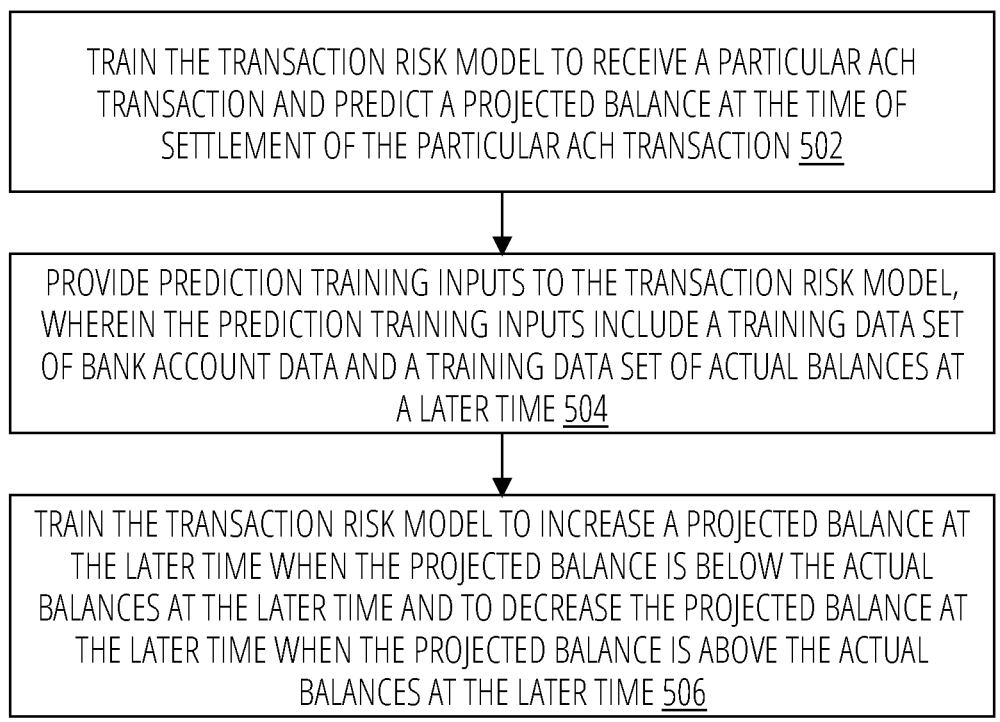
FIG. 5A illustrates an example method for training an example machine learning model configured to receive a particular ACH transaction and predict a projected balance at the time of settlement of the particular ACH transaction in accordance with some aspects of the present technology.

FIG. 5A illustrates an example method 500a for training an example machine learning model (e.g., a prediction model 210 and/or risk score model 212) configured to receive a particular ACH transaction and predict a projected balance at the time of settlement of the particular ACH transaction. Although the example method 500a depicts a particular sequence of operations, the sequence may be altered without departing from the scope of the present disclosure. For example, some of the operations depicted may be performed in parallel or in a different sequence that does not materially affect the function of the method 500a. In other examples, different components of an example device or system that implements the method 500a may perform functions at substantially the same time or in a specific sequence.

In step 502, method 500a trains the transaction risk model to receive a particular ACH transaction and predict a projected balance at the time of settlement of the particular ACH transaction. For example, ML service 112 trains the transaction risk model to receive a particular ACH transaction and predict a projected balance at the time of settlement of the particular ACH transaction.

In step 504, method 500a provides prediction training inputs to the transaction risk model, wherein the prediction training inputs include a training data set of bank account data and a training data set of actual balances at a later time. For example, ML service 112 provides prediction training inputs to the transaction risk model, wherein the prediction training inputs include a training data set of bank account data and a training data set of actual balances at a later time.

In step 506, method 500a trains the transaction risk model to increase a projected balance at the later time when the projected balance is below the actual balances at the later time and to decrease the projected balance at the later time when the projected balance is above the actual balances at the later time. For example, ML service 112 trains the transaction risk model to increase a projected balance at the later time when the projected balance is below the actual balances at the later time and to decrease the projected balance at the later time when the projected balance is above the actual balances at the later time.

In some embodiments, the inquiring entity can receive the projected balance from the transaction risk model and can make a determination about whether to go initiate the transaction.

It is further considered that the inquiring entity can send information regarding the determination and an outcome of the determination back to continue training the transaction risk model. For example, if the inquiring entity decided to initiate the transaction, the inquiring entity can provide feedback indicating that the inquiring entity initiated the transaction and/or an actual balance at the end of the transaction.

ML service 112 can utilize the feedback information to continue training the transaction risk model for fraud and/or insufficient funds. For example, ML service 112 can utilize different types of information including, but not limited to, cash inflow/outflow, transfers, payments, payrolls, expenses, balance information, device-related data, phone-related data, e-mail related data, and other data aggregated by subject evaluation service 124 and/or transaction risk system 208.

Although FIG. 5A is addressed with respect to training a machine learning model based on ACH transactions, one of ordinary skill in the art would understand that the principles discussed herein apply to any transactions susceptible to risk from an account status or other parameter change while the transaction is being processed. For example, the transaction risk models can be encourage and discourage predictions based on activity data and account data as discussed above. For example, a history of timely return of books to a library would be used to encourage a higher probability of other books being returned on time. As another example, a pattern of content posted on social media network that violates terms of service may be used to increase a probability that the account on the social media network will be suspended and no longer in good standing.

Figure 5B:
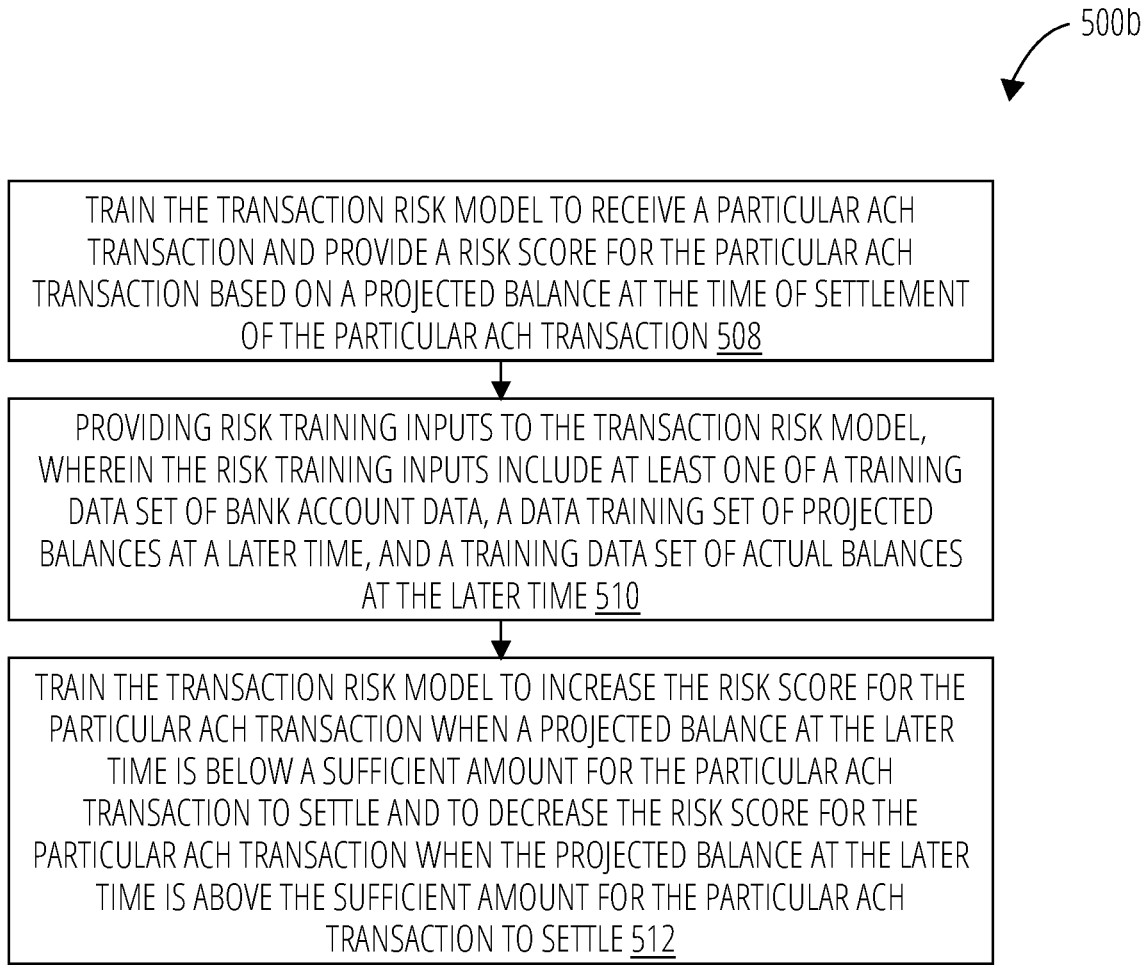
FIG. 5B illustrates an example method for training an example machine learning model configured to receive a particular ACH transaction and provide a risk score for the particular ACH transaction based on a projected balance at the time of settlement of the particular ACH transaction in accordance with some aspects of the present technology.

FIG. 5B illustrates an example method 500b for training an example machine learning model (e.g., a prediction model 210 and/or risk score model 212) configured to receive a particular ACH transaction and provide a risk score for the particular ACH transaction based on a projected balance at the time of settlement of the particular ACH transaction. Although the example method 500b depicts a particular sequence of operations, the sequence may be altered without departing from the scope of the present disclosure. For example, some of the operations depicted may be performed in parallel or in a different sequence that does not materially affect the function of the method 500b. In other examples, different components of an example device or system that implements the method 500b may perform functions at substantially the same time or in a specific sequence.

In step 508, method 500b trains the transaction risk model to receive a particular ACH transaction and provide a risk score for the particular ACH transaction based on a projected balance at the time of settlement of the particular ACH transaction. For example, ML service 112 trains the transaction risk model to receive a particular ACH transaction and provide a risk score for the particular ACH transaction based on a projected balance at the time of settlement of the particular ACH transaction.

In step 510, method 500b providing risk training inputs to the transaction risk model, wherein the risk training inputs include at least one of a training data set of bank account data, a data training set of projected balances at a later time, and a training data set of actual balances at the later time. For example, ML service 112 providing risk training inputs to the transaction risk model, wherein the risk training inputs include at least one of a training data set of bank account data, a data training set of projected balances at a later time, and a training data set of actual balances at the later time.

In step 512, method 500b trains the transaction risk model to increase the risk score for the particular ACH transaction when a projected balance at the later time is below a sufficient amount for the particular ACH transaction to settle and to decrease the risk score for the particular ACH transaction when the projected balance at the later time is above the sufficient amount for the particular ACH transaction to settle. For example, ML service 112 trains the transaction risk model to increase the risk score for the particular ACH transaction when a projected balance at the later time is below a sufficient amount for the particular ACH transaction to settle and to decrease the risk score for the particular ACH transaction when the projected balance at the later time is above the sufficient amount for the particular ACH transaction to settle.

In some embodiments, the inquiring entity can receive the risk score and/or fraud risk score from the transaction risk system 208 and can make a determination about whether to go initiate the transaction.

It is further considered that the inquiring entity can send information regarding the determination and an outcome of the determination back to continue training the machine learning model. For example, if the inquiring entity decided to initiate the transaction, the inquiring entity can provide feedback indicating that the inquiring entity initiated the transaction and/or a result of the decision (e.g., whether the transaction was successful, rescinded, fraudulent, unable to be completed, etc.). ML service 112 can utilize the feedback information to continue training the transaction risk model by adjusting the parameters and/or weights thereof used to generate the risk scores.

Although FIG. 5B is addressed with respect to training a machine learning model based on ACH transactions, one of ordinary skill in the art would understand that the principles discussed herein apply to any transactions susceptible to risk from an account status or other parameter change while the transaction is being processed. For example, the transaction risk models can increase and decrease risk scores and/or fraud risk scores based on activity data and account data as discussed above. For example, a history of timely return of books to a library would be used to encourage a lower risk score or decrease a risk score of other books being returned late. As another example, a pattern of content posted on social media network that violates terms of service may be used to increase a risk score that the account on the social media network will be suspended and no longer in good standing.

It is further considered that methods 500a and 500b can be combined to train a single transaction risk model. Some of these operations may be performed in parallel or in a different sequence that would not materially affect the function of the combination of methods 500a, 500b.

In some embodiments, the machine learning model can be trained with a loss function used to analyze error in the output. Any suitable loss function definition can be used, such as Cross-Entropy loss. Another example of a loss function includes the mean squared error (MSE), defined as E_total=Σ(½ (target−output)^2). The loss can be set to be equal to the value of E_total. The loss (or error) will be high for the initial training data since the actual values will be much different than the predicted output. The goal of training is to minimize the amount of loss so that the predicted output is the same as the training output. The machine learning model can perform a backward pass by determining which inputs (weights) most contributed to the loss of the model, and can adjust the weights so that the loss decreases and is eventually minimized.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
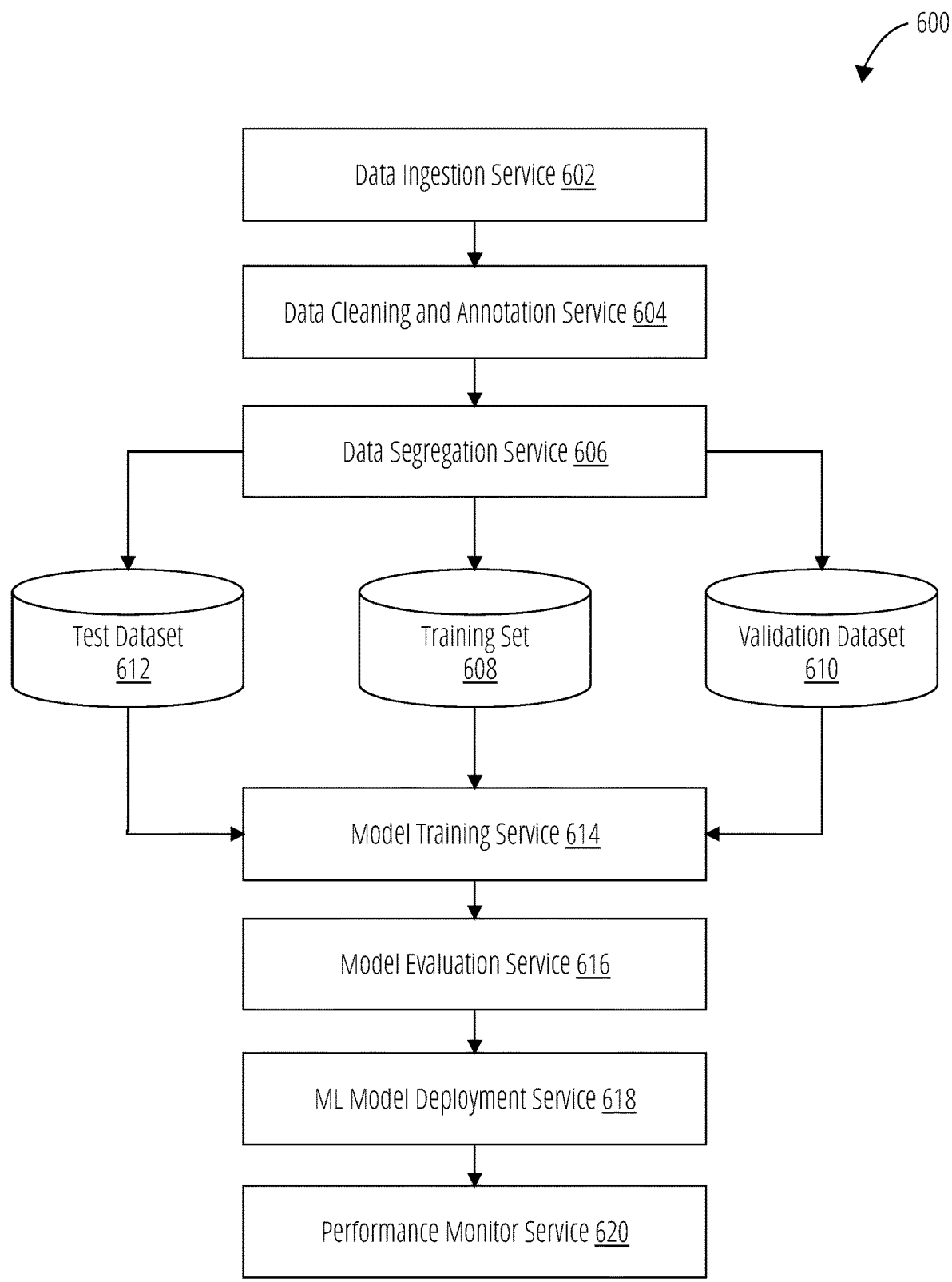
FIG. 6 illustrates a method for training a machine learning model in accordance with some aspects of the present technology.

FIG. 6 illustrates an example lifecycle 600 of a ML model in accordance with some examples. The first stage of the lifecycle 600 of a ML model is a data ingestion service 602 to generate datasets described below. ML models require a significant amount of data for the various processes described in FIG. 6 and the data persisted without undertaking any transformation to have an immutable record of the original dataset. The data can be provided from third party sources such as publicly available dedicated datasets. The data ingestion service 602 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data from the consumer of the data (e.g., an ML model training pipeline). For offline data production, when source data is available from the producer, the producer publishes a message and the data ingestion service 602 retrieves the data. In some examples, the data ingestion service 602 may be online and the data is streamed from the producer in real-time for storage in the data ingestion service 602.

After data ingestion service 602, a data preprocessing service preprocesses the data to prepare the data for use in the lifecycle 600 and includes at least data cleaning, data transformation, and data selection operations. The data cleaning and annotation service 604 removes irrelevant data (data cleaning) and general preprocessing to transform the data into a usable form. The data cleaning and annotation service 604 includes labelling of features relevant to the ML model. In some examples, the data cleaning and annotation service 604 may be a semi-supervised process performed by a ML to clean and annotate data that is complemented with manual operations such as labeling of error scenarios, identification of untrained features, etc.

After the data cleaning and annotation service 604, data segregation service 606 to separate data into at least a training set 608, a validation dataset 610, and a test dataset 612. Each of the training set 608, a validation dataset 610, and a test dataset 612 are distinct and do not include any common data to ensure that evaluation of the ML model is isolated from the training of the ML model.

The training set 608 is provided to a model training service 614 that uses a supervisor to perform the training, or the initial fitting of parameters (e.g., weights of connections between neurons in artificial neural networks) of the ML model. The model training service 614 trains the ML model based a gradient descent or stochastic gradient descent to fit the ML model based on an input vector (or scalar) and a corresponding output vector (or scalar).

After training, the ML model is evaluated at a model evaluation service 616 using data from the validation dataset 610 and different evaluators to tune the hyperparameters of the ML model. The predictive performance of the ML model is evaluated based on predictions on the validation dataset 610 and iteratively tunes the hyperparameters based on the different evaluators until a best fit for the ML model is identified. After the best fit is identified, the test dataset 612, or holdout data set, is used as a final check to perform an unbiased measurement on the performance of the final ML model by the model evaluation service 616. In some cases, the final dataset that is used for the final unbiased measurement can be referred to as the validation dataset and the dataset used for hyperparameter tuning can be referred to as the test dataset.

After the ML model has been evaluated by the model evaluation service 616, an ML model deployment service 618 can deploy the ML model into an application or a suitable device. The deployment can be into a further test environment such as a simulation environment, or into another controlled environment to further test the ML model.

After deployment by the ML model deployment service 618, a performance monitor service 620 monitors for performance of the ML model. In some cases, the performance monitor service 620 can also record additional transaction data that can be ingested via the data ingestion service 602 to provide further data, additional scenarios, and further enhance the training of ML models.

Figure 7:
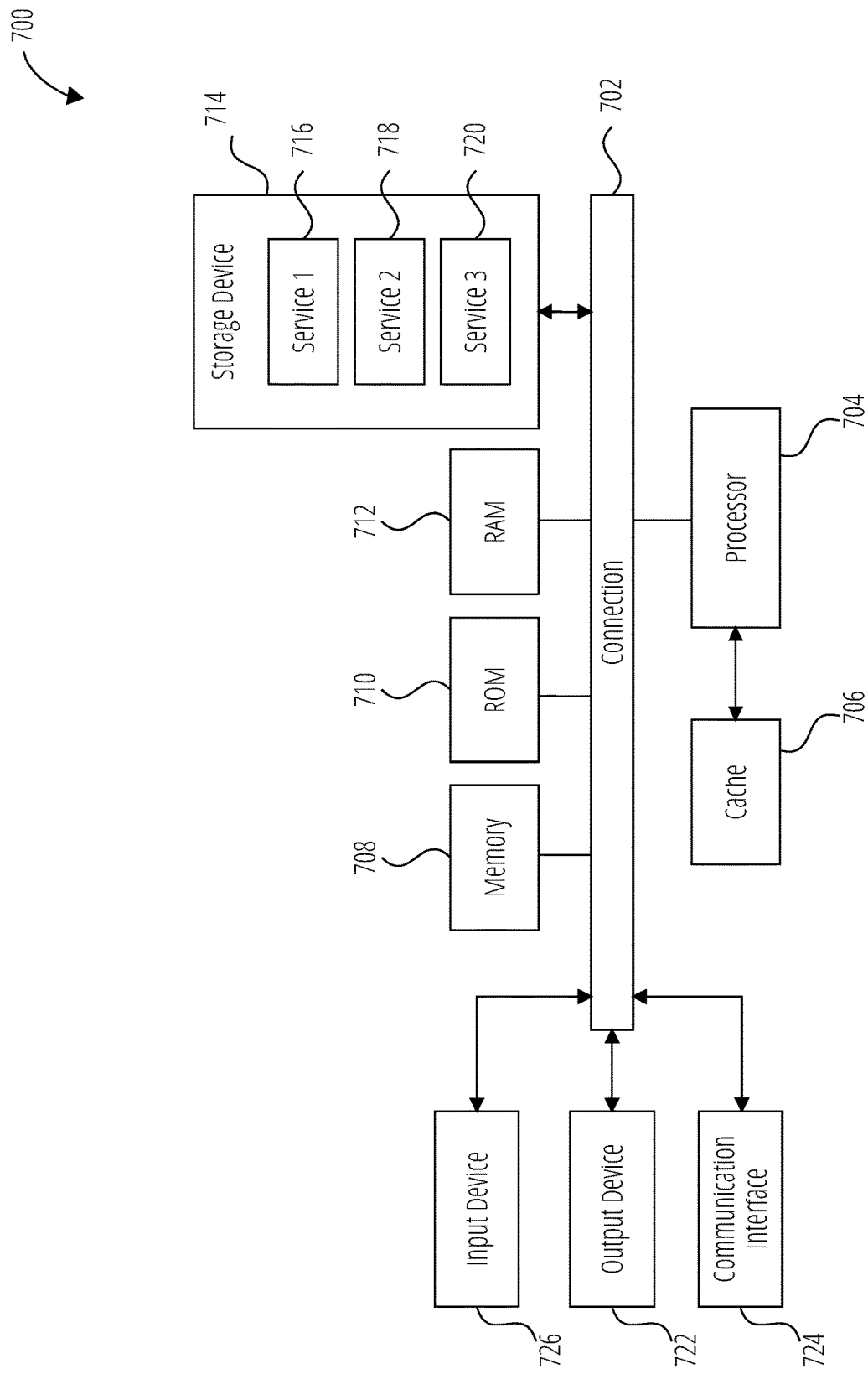
FIG. 7 illustrates an example of a system for implementing certain aspects of the present technology in accordance with some aspects of the present technology.

FIG. 7 shows an example of computing system 700, which can be for example any computing device making up access device 102, partner web service 116, subject evaluation service 124, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Example clauses descriptive of the present technology include:

Clause 1. A computer-implemented method comprising: receiving, by an evaluation service, a request from a web service regarding a subject entity performing a current transaction, where the current transaction is dependent on a parameter of a user account associated with the subject entity meeting a criterion, receiving, by the evaluation service, historical account data from the user account associated with the subject entity, predicting, by the evaluation service, a projected parameter at a future time of the user account associated with the subject entity, wherein the evaluation service includes a trained machine learning model configured to receive the historical account data for the user account and to predict the projected parameter, and generating, by the evaluation service, a probability that the projected parameter at the future time is correct.

Clause 2. The computer-implemented method of clause 1, wherein the user account is at an entity other than the subject entity and the evaluation service.

Clause 3. The computer-implemented method of any of clauses 1-2, further comprising: requesting the account data for the user account from a partner service, wherein the partner service has access to the historical account data from the user account associated with the subject entity.

Clause 4. The computer-implemented method of any of clauses 1-3, wherein the predicting the projected parameter at the future time further includes receiving data defining the current transaction with the request, and inputting the data defining the current transaction into the trained machine learning model.

Clause 5. The computer-implemented method of any of clauses 1-4, the method further comprising: training the machine learning model to receive data defining a particular transaction and predict the projected parameter at a time of settlement of the particular transaction, the training includes providing prediction training inputs to the evaluation service, wherein the prediction training inputs include a training data set of historical user account data and a training data set of projected parameters at a later time.

Clause 6. The computer-implemented method of any of clauses 1-5, wherein the evaluation service is configured to receive data defining a particular ACH transaction and output a future balance of an account to supply funds for the particular ACH transaction a probability that the future balance will exist at a time of settlement of the particular ACH transaction.

Clause 7. The computer-implemented method of any of clauses 1-6, wherein the historical account data includes at least one of a withdrawal, a deposit, an ACH transaction, a debit purchase, and a direct deposit.

Clause 8. the computer-implemented method of any of clauses 1-7, wherein the historical account data includes both blockchain transactions and traditional transactions.

Clause 9. The computer-implemented method of any of clauses 1-8, further comprising: determining, by a fraud risk model, a fraud risk score for the particular ACH transaction based on the historical account data and the future balance in the account at the time of settlement of the particular ACH transaction, wherein the fraud risk score identifies a likelihood of the particular ACH transaction being fraudulent.

Clause 10. The computer-implemented method of any of clauses 1-9, wherein the future balance is based at least in part on at least one of historical transaction patterns, categories of transactions, account balance fluctuations, payroll patterns, and direct deposit patterns.

Clause 11. The computer-implemented method of any of clauses 1-10, wherein the trained machine model identifies at least one of the historical transaction patterns, categories of transactions, account balance fluctuations, payroll patterns, and direct deposit patterns from the historical account data.

Clause 12. A system comprising: a processor; and a memory storing instructions that, when executed by the processor, cause the processor to: receive a request from an inquiring entity regarding a subject entity performing a current automated clearing house (ACH) transaction; receive bank account data from an account associated with the subject entity, wherein the bank account data includes historical transaction data and balance data, and wherein the historical transaction data includes data associated with historical transactions that change a balance of the account; predict, by a transaction risk model, a projected balance in the account at the time of settlement of the current ACH transaction based on the bank account data; and generate, by the transaction risk model, a risk score for the current ACH transaction based on the historical transaction data and the projected balance, wherein the risk score identifies a likelihood that a balance of the account will not contain enough funds to settle the current ACH transaction.

Clause 13. The system of clause 12, wherein determining the projected balance includes inputting the current ACH transaction into the transaction risk model, wherein the transaction risk model is configured to receive a particular ACH transaction and output a risk score associated with the particular ACH transaction.

Clause 14. The system of any of clauses 12-13, wherein the historical transaction data includes at least one of a withdrawal, a deposit, an ACH transaction, a debit purchase, and a direct deposit.

Clause 15. The system of any of clauses 12-14, wherein the instructions further cause the processor to: train the transaction risk model to receive a particular ACH transaction and predict a projected balance at the time of settlement of the particular ACH transaction, the training comprising: provide prediction training inputs to the transaction risk model, wherein the prediction training inputs include a training data set of bank account data and a training data set of actual balances at a later time; and train the transaction risk model to increase a projected balance at the later time when the projected balance is below the actual balances at the later time and to decrease the projected balance at the later time when the projected balance is above the actual balances at the later time.

Clause 16. The system of any of clauses 12-15, wherein the instructions further cause the processor to: train the transaction risk model to receive a particular ACH transaction and provide a risk score for the particular ACH transaction based on a projected balance at the time of settlement of the particular ACH transaction, the training comprising: provide risk training inputs to the transaction risk model, wherein the risk training inputs include at least one of a training data set of bank account data, a data training set of projected balances at a later time, and a training data set of actual balances at the later time; and train the transaction risk model to increase the risk score for the particular ACH transaction when a projected balance at the later time is below a sufficient amount for the particular ACH transaction to settle and to decrease the risk score for the particular ACH transaction when the projected balance at the later time is above the sufficient amount for the particular ACH transaction to settle.

Clause 17. The system of any of clauses 12-16, wherein the historical transaction data includes both blockchain transactions and traditional transactions.

Clause 18. The system of any of clauses 12-17, wherein the instructions further cause the processor to: determine, by a fraud risk model, a fraud risk score for the current ACH transaction based on the historical transaction data and the projected balance in the account at the time of settlement of the current ACH transaction, wherein the fraud risk score identifies a likelihood of the current ACH transaction being fraudulent.

Clause 19. A non-transitory computer-readable storage medium storing instructions that when executed by a processor, cause the processor to: receive a request from an inquiring entity regarding a subject entity performing a current automated clearing house (ACH) transaction; receive bank account data from an account associated with the subject entity, wherein the bank account data includes historical transaction data and balance data, and wherein the historical transaction data includes data associated with historical transactions that change a balance of the account; predict, by a transaction risk model, a projected balance in the account at a time of settlement of the current ACH transaction based on the bank account data; and generate, by the transaction risk model, a risk score for the current ACH transaction based on the historical transaction data and the projected balance, wherein the risk score identifies a likelihood that a balance of the account will not contain enough funds to settle the current ACH transaction.

Clause 20. The computer-readable storage medium of clause 19, wherein determining the projected balance includes inputting the current ACH transaction into the transaction risk model, wherein the transaction risk model is configured to receive a particular ACH transaction and output a risk score associated with the particular ACH transaction.

What is claimed is:

1. A computer-implemented method comprising:
    receiving, by an evaluation service, a request from a web service regarding a subject entity performing an automated clearinghouse (ACH) transaction, wherein the ACH transaction is dependent on a parameter of a user account associated with the subject entity meeting a criterion, wherein the parameter of the user account is a projected balance in the user account and the criterion is that the projected balance is sufficient to cover the ACH transaction at a predicted time of settlement of the ACH transaction;
    receiving, by the evaluation service, event data from an events database, the event data was reported from a plurality of partner web services and third-party databases;
    receiving, by the evaluation service, historical account data from the user account associated with the subject entity, wherein the historical account data includes data associated with historical transactions that change a balance of the account;
    predicting, by the evaluation service, based on data defining the ACH transaction and the historical account data, a projected parameter at a future time of the user account associated with the subject entity and a risk score, the projected parameter including the projected balance in the account at the future time that is associated with the predicted time of the settlement of the ACH transaction based on the historical account data, wherein the risk score identifies a probability that the balance of the account will not contain enough funds to settle the ACH transaction;
    determining, by the evaluation service, a fraud risk score for the ACH transaction based on the historical transaction data and the projected balance in the account at the time of settlement of the ACH transaction, and the events data from the events database from the plurality of partner web services, wherein the fraud risk score identifies a probability that the ACH transaction is fraudulent.

2. The computer-implemented method of claim 1, further comprising:
    requesting the account data for the user account from a partner service, wherein the partner service has access to the historical account data from the user account associated with the subject entity.

3. The computer-implemented method of claim 1, wherein the evaluation service includes a machine learning model, the method further comprising:
    training the machine learning model to receive data defining a particular transaction and predict the projected parameter at a time of settlement of the particular transaction, the training comprising:
        providing prediction training inputs to the evaluation service, wherein the prediction training inputs include a training data set of historical user account data and a training data set of projected parameters at a later time.

4. The computer-implemented method of claim 1, wherein the historical account data includes at least one of a withdrawal, a deposit, a debit purchase, and a direct deposit.

5. The computer-implemented method of claim 1, wherein the historical account data includes both blockchain transactions and traditional transactions.

6. The computer-implemented method of claim 3, wherein the future balance is based at least in part on at least one of historical account patterns, categories of transactions, account balance fluctuations, payroll patterns, and direct deposit patterns.

7. The computer-implemented method of claim 6, wherein the trained machine learning model identifies at least one of the historical transaction patterns, the categories of transactions, the account balance fluctuations, the payroll patterns, and the direct deposit patterns from the historical account data.

8. A system comprising:
a processor; and
a memory storing instructions that, when executed by the processor, cause the processor to:
  receive a request from an inquiring entity regarding a subject entity performing a automated clearing house (ACH) transaction;
  receive event data from an events database, the event data was reported from a plurality of partner web services and third-party databases;
  receive bank account data from an account associated with the subject entity, wherein the bank account data includes historical transaction data and balance data, and wherein the historical transaction data includes data associated with historical transactions that change a balance of the account;
  predict, by a transaction risk model, based on data defining the ACH transaction and the historical account data, a projected balance in the account at a time of settlement of the ACH transaction and a risk score based on the bank account data that is associated with a predicted time of settlement of the ACH transaction based on the historical account data, wherein the risk score identifies a probability that the balance of the account will not contain enough funds to settle the ACH transaction; and
  determining, by an evaluation service, a fraud risk score for the ACH transaction based on the historical transaction data and the projected balance in the account at the time of settlement of the ACH transaction, and the events data from the events database from the plurality of partner web services, wherein the fraud risk score identifies a probability that the ACH transaction is fraudulent.

9. The system of claim 8, wherein the historical transaction data includes at least one of a withdrawal, a deposit, a debit purchase, and a direct deposit.

10. The system of claim 8, wherein the instructions further cause the processor to:
train the transaction risk model to receive the ACH transaction and predict a projected balance at the time of settlement of the ACH transaction, the training comprising:
  provide prediction training inputs to the transaction risk model, wherein the prediction training inputs include a training data set of bank account data and a training data set of actual balances at a later time; and
  train the transaction risk model to increase a projected balance at the later time when the projected balance is below the actual balances at the later time and to decrease the projected balance at the later time when the projected balance is above the actual balances at the later time.

11. The system of claim 8, wherein the instructions further cause the processor to:
train the transaction risk model to receive a particular ACH transaction and provide a risk score for the particular ACH transaction based on a projected balance at the time of settlement of the particular ACH transaction, the training comprising:
  provide risk training inputs to the transaction risk model, wherein the risk training inputs include at least one of a training data set of bank account data, a data training set of projected balances at a later time, and a training data set of actual balances at the later time;
  and train the transaction risk model to increase the risk score for the particular ACH transaction when a projected balance at the later time is below a sufficient amount for the particular ACH transaction to settle and to decrease the risk score for the particular ACH transaction when the projected balance at the later time is above the sufficient amount for the particular ACH transaction to settle.

12. The system of claim 8, wherein the historical transaction data includes both blockchain transactions and traditional transactions.

13. A non-transitory computer-readable storage medium storing instructions that when executed by a processor, cause the processor to:
  receive a request from an inquiring entity regarding a subject entity performing a automated clearing house (ACH) transaction;
  receive event data from an events database, the event data was reported from a plurality of partner web services and third-party databases;
  receive bank account data from an account associated with the subject entity, wherein the bank account data includes historical transaction data and balance data, and wherein the historical transaction data includes data associated with historical transactions that change a balance of the account;
  predict, by a transaction risk model, based on data defining the ACH transaction and the historical account data, a projected balance in the account at a time of settlement of the ACH transaction and a risk score based on the bank account data that is associated with a predicted time of settlement of the ACH transaction based on the historical account data, wherein the risk score identifies a probability that the balance of the account will not contain enough funds to settle the ACH transaction; and
  determine, by an evaluation service, a fraud risk score for the ACH transaction based on the historical transaction data and the projected balance in the account at the time of settlement of the ACH transaction, and the events data from the events database from the plurality of partner web services, wherein the fraud risk score identifies a probability that the ACH transaction is fraudulent.

14. The computer-implemented method of claim 3, further comprising:
further training the machine learning model by inputting the generated probability and one or more prediction training inputs, wherein a transaction risk model of the machine learning training model is trained with the generated probability and the prediction training inputs to generate risk scores to adjust the projected parameter for generating future probabilities of subsequent electronic transactions.

15. The computer-implemented method of claim 1, wherein the events data includes behavioral and transaction event data pertaining to the subject entity, wherein the events data is used by the evaluation service to identify an entity fraudulently impersonating the subject entity.

16. The computer-implemented method of claim 1, further comprising:
   correlating data of known subject entities across transactions by aggregating information from the plurality of partner web services and third-party databases.

17. The computer-implemented method of claim 1, further comprising:
   providing a response to the web service including the fraud risk score and indication of whether the projected parameter will be sufficient to cover the ACH transaction at the predicted time of settlement of the ACH transaction.

* * * * *